United States Patent
Rikiso et al.

(10) Patent No.: US 12,283,811 B2
(45) Date of Patent: Apr. 22, 2025

(54) POWER SYSTEM AND METHOD OF CONTROLLING POWER SYSTEM

(71) Applicant: FURUKAWA ELECTRIC CO., LTD., Tokyo (JP)

(72) Inventors: Masahiro Rikiso, Tokyo (JP); Asuka Abe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/311,970

(22) Filed: May 4, 2023

(65) Prior Publication Data

US 2023/0275427 A1 Aug. 31, 2023

Related U.S. Application Data

(63) Continuation of application No. PCT/JP2021/040275, filed on Nov. 1, 2021.

(30) Foreign Application Priority Data

Nov. 20, 2020 (JP) .................. 2020-193588

(51) Int. Cl.
*H02J 1/10* (2006.01)
*H02M 1/00* (2007.01)

(52) U.S. Cl.
CPC .............. *H02J 1/102* (2013.01); *H02J 1/106* (2020.01); *H02M 1/0067* (2021.05)

(58) Field of Classification Search
CPC ...... H02J 1/102; H02J 1/106; H02J 13/00032; H02J 2300/24; H02J 2310/10; H02J 1/10;
(Continued)

(56) References Cited

U.S. PATENT DOCUMENTS

| 11,133,673 B2 | 9/2021 | Yamashita et al. |
| 2014/0077596 A1* | 3/2014 | Nishibayashi ............ H02J 3/38 307/29 |

(Continued)

FOREIGN PATENT DOCUMENTS

| JP | 2017-212785 A | 11/2017 |
| JP | 2018-29408 A | 2/2018 |

(Continued)

OTHER PUBLICATIONS

Indian Office Action issued Apr. 30, 2024 in Indian Patent Application No. 202347034361, 7 pages.

(Continued)

*Primary Examiner* — Elim Ortiz
*Assistant Examiner* — Xuan Ly
(74) *Attorney, Agent, or Firm* — Oblon, McClelland, Maier & Neustadt, L.L.P.

(57) ABSTRACT

A power system includes: power converters, each including a power conversion unit configured to convert an input power, and output the converted power, a controller configured to execute a primary control for controlling the output by controlling the power conversion unit based on: a reference function having a drooping characteristic defined according to an input value and a voltage of the bus or a power of the power converter to which the power conversion unit is connected, and an update unit configured to update a control method on the output; a central control device configured to execute a secondary control of controlling the power converter; the bus connected to the power conversion unit; and a power element connected to the power converter and configured to supply, consume and charge power. The central control device performs the secondary control on the power converter according to an update instruction to update the control method.

5 Claims, 9 Drawing Sheets

(58) Field of Classification Search
CPC .... H02M 1/0067; H02M 1/0003; H02M 3/00;
H02M 7/00; H02M 1/007; H02M 1/00
USPC ......................................................... 307/82
See application file for complete search history.

(56) References Cited

U.S. PATENT DOCUMENTS

| | | |
|---|---|---|
| 2017/0110880 A1 | 4/2017 | Chen et al. |
| 2020/0083709 A1* | 3/2020 | Umezu .................... H02P 9/00 |
| 2020/0280183 A1 | 9/2020 | Yamashita et al. |

FOREIGN PATENT DOCUMENTS

| | | |
|---|---|---|
| JP | 6371603 B2 | 8/2018 |
| WO | WO 2019/103059 A1 | 5/2019 |

OTHER PUBLICATIONS

International Search Report issued Dec. 28, 2021 in PCT/JP2021/040275 filed on Nov. 1, 2021, 2 pages.

\* cited by examiner

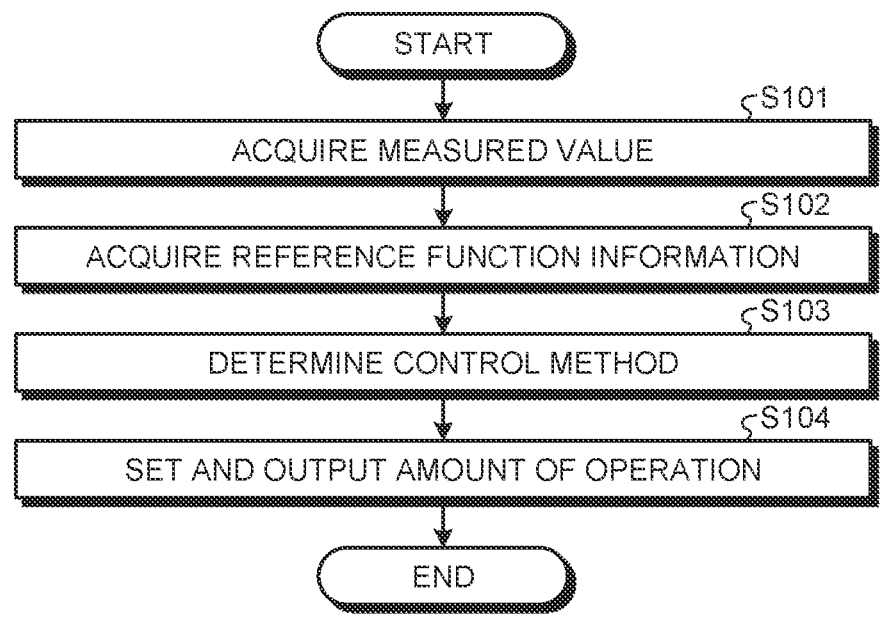
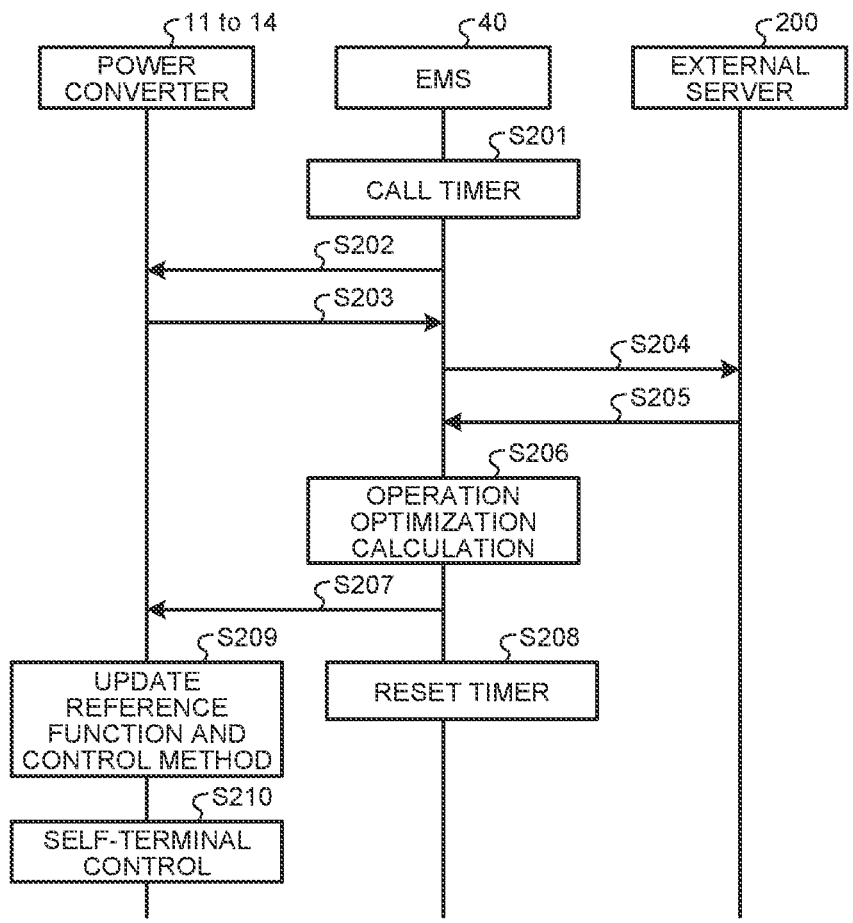

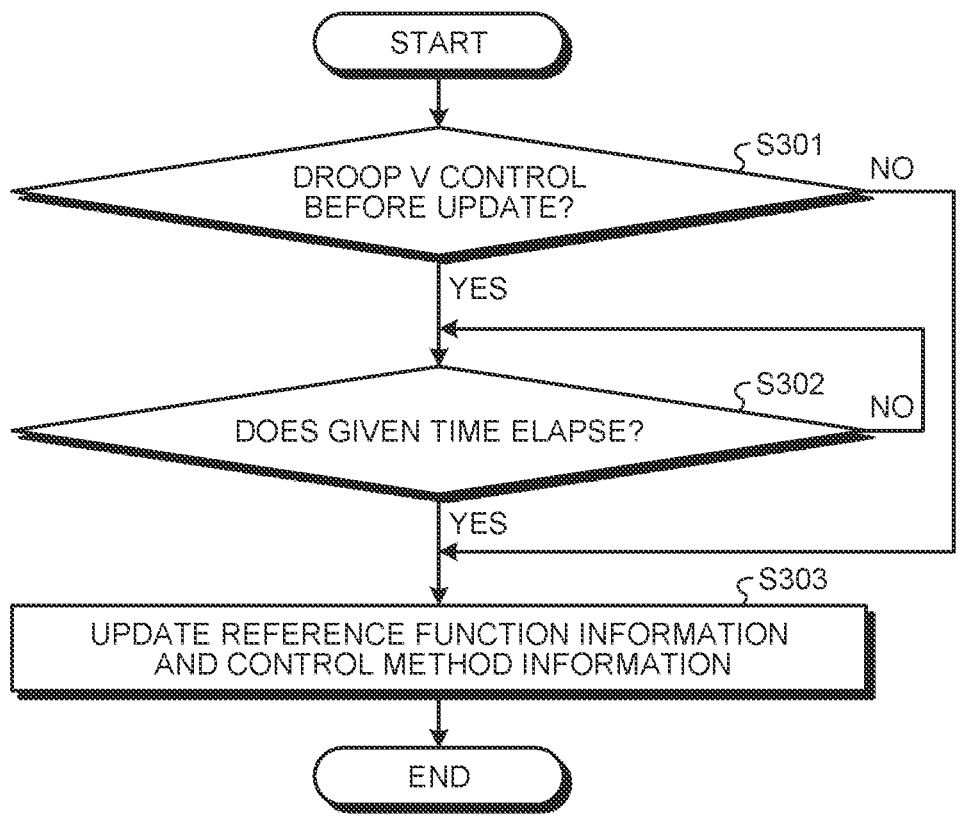

POWER SYSTEM AND METHOD OF CONTROLLING POWER SYSTEM

This application is a continuation of International Application No. PCT/JP2021/040275, filed on Nov. 1, 2021 which claims the benefit of priority of the prior Japanese Patent Application No. 2020-193588, filed on Nov. 20, 2020, the entire contents of which are incorporated herein by reference.

BACKGROUND

The present disclosure relates to a power system and a method of controlling a power system.

A power network that uses power that is locally produced and is to be locally consumed is attracting attention as means alternative to a large-scale power network that is dependent on fossil energy or nuclear energy. A wide variety of devices, such as a photovoltaic device (PV) that is a power generation device that generates electric power using renewable energy, a stationary power storage device, and an electric vehicle (EV), are connected to the power network that uses power that is locally produced and is to be locally consumed. Each of the above-described devices is a direct-current power supply and therefore examination on construction of a direct current (DC) power network (DC grid) has been moved forward.

There is, as a method of controlling the DC grid, a method of performing centralized control on the amount of power of a DC bus of the DC grid by performing constant current control or constant voltage control on each of the devices described above according to an instruction of a central controller. The centralized control method has a problem in that, while it is possible to control the entire DC grid easily, it is difficult to smoothly deal with a rapid change in the demand for and supply of power. The centralized control method has a possibility that, particularly when the constant voltage control is performed in multiple spots in a wide area, the voltage control would become unstable and lead to fluctuations in voltage of the DC bus. Furthermore, the constant voltage control in multiple spots has a problem in that load sharing for power interchange between the devices is not enabled, that is, each device is unable to supply power to the DC bus at the constant voltage collaboratively according to the power supply ability of each of the devices.

Thus, the DC grid is controlled by assigning a reference function based on the power (P) of the self-terminal and the voltage (V) of the self-terminal to each power converter and causing each power converter to perform control in an autonomous-decentralized manner (see Japanese Patent No. 6371603, International Publication Pamphlet No. 2019/103059 and Japanese Laid-open Patent Publication No. 2018-29408). When a reference function in which a target voltage value has a dropping characteristic according to the amount of power that is requested for the DC bus, that is, has a droop characteristic is used, the control is sometimes referred to as droop control. Performing droop control on each power converter in an autonomous-decentralized manner makes it possible to stabilize the voltage of the DC bus while performing load sharing for power interchange between the devices according to the amount of power that is requested for the DC bus.

SUMMARY

A plurality of the power converters that are connected to the DC bus include both a power converter that observes an output voltage, determines a target power, and performs feedback control (power control) such that the difference between the target power and an output power is zero and a power converter that observes an output power, determines a target voltage, and performs feedback control (voltage control) such that the difference between the target voltage and an output voltage is zero. When the method of feedback control is changed according to an instruction from a central controller, for example, if a delay occurs in communication from the central controller to the power converter, the case where the power converter that makes a change from the voltage control to the power control completes changing the control method first and changing the control method in the power converter that makes a change from the power control to the voltage control delays may occur. In this case, there is a state in which there is no power converter that performs feedback control such that the difference between the target voltage and the output voltage is zero and there is a risk that an unintentional increase in voltage or an unintentional decrease in voltage would occur in the DC bus.

There is a need for inhibiting occurrence of an unintentional increase in voltage or an unintentional decrease in voltage when updating a control method in a power converter.

A power system according to one aspect of the present disclosure includes: a plurality of power converters, each including a power conversion unit configured to convert an input power, and output the converted power, a controller configured to execute a primary control for controlling the output by controlling the power conversion unit based on: a reference function having a drooping characteristic defined according to an input value and a voltage of the bus or a power of the power converter to which the power conversion unit is connected, and an update unit configured to update a control method on the output; a central control device configured to execute a secondary control of controlling the power converter; the bus connected to the power conversion unit; and a power element connected to the power converter and configured to supply, consume and charge power wherein the central control device is configured to perform the secondary control on the power converter according to an update instruction to update the control method, and the update unit is configured to: update the control method according to the update instruction output from the central control device; and update the control method such that there is always at least one of the power converters that performs voltage control in a period in which the power converters update the control method.

A method according to another aspect of the present disclosure of controlling a power system including a plurality of power converters connected to a bus, each of the power converters including: a power conversion unit configured to convert an input power and output the converted power; a power element connected to the power converter and configured to supply, consume and charge power; and a central control device configured to control the power converter, includes: converting, by the power conversion unit, the input power and outputting the converted power; controlling the power conversion unit and executing a primary control for controlling the output based on a reference function having a drooping characteristic defined according to an input value and a voltage of the bus or a power of the power converter to which the power conversion unit is connected; performing, by the central control device, a secondary control on the power converter according to an update instruction to update the control method; and updating, by the power converter, a control method on the output according to the update instruction, wherein the control method is updated such that there is always at least one of the power converters that performs voltage control in a period in which the power converters update the control method.

BRIEF DESCRIPTION OF THE DRAWINGS

FIG. 5 is a flowchart illustrating a flow of a process that a controller of the power converter performs;

FIG. 6 is a sequence chart illustrating an example of a method of controlling the power system;

FIG. 7 is a flowchart illustrating a flow of a process that the controller of the power converter performs;

DETAILED DESCRIPTION

Figure 1:
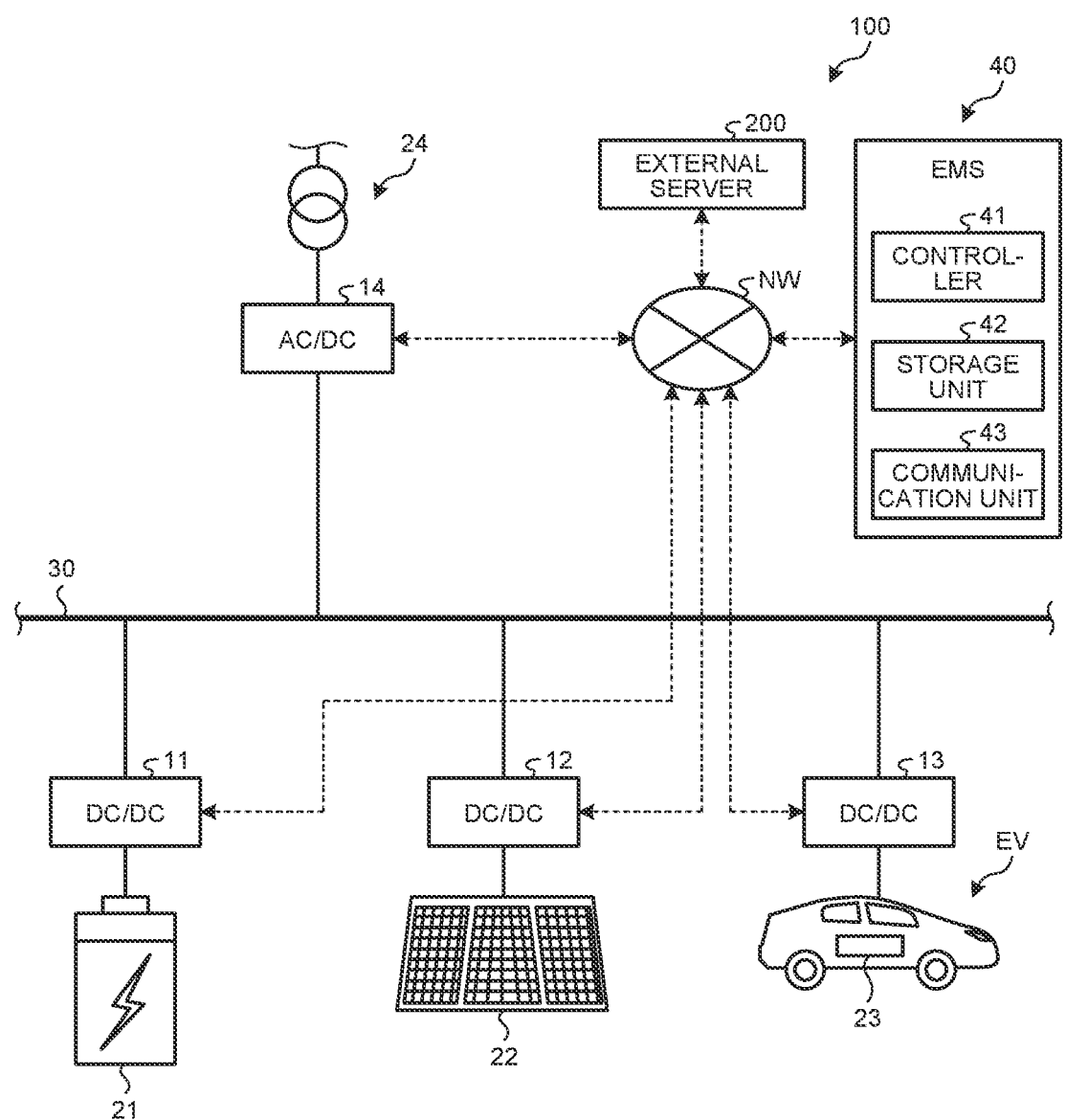
FIG. 1 is a diagram illustrating a configuration of a power system according to a first embodiment.
Figure 2:
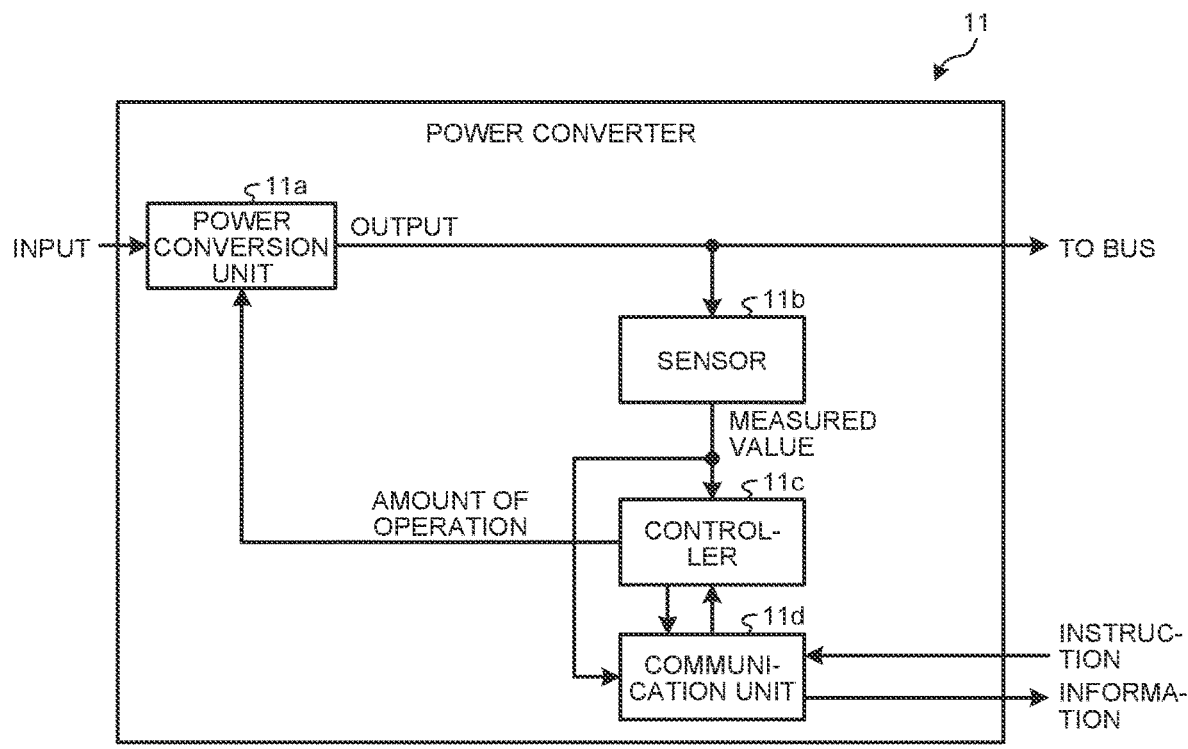
FIG. 2 is a diagram illustrating a configuration of a power converter illustrated in FIG. 1.

With reference to the drawings, embodiments of the present disclosure will be described below. Note that the disclosure is not limited by the embodiments described below. Furthermore, the same reference numerals are assigned to the same components in the illustration of the drawings.

First Embodiment

Configuration of Power System

FIG. 1 is a diagram illustrating a configuration of a power system according to a first embodiment. A power system 100 includes a plurality of power converters 11, 12, 13 and 14, a plurality of power elements 21, 22, 23 and 24, and a bus 30. The power system 100 further includes an EMS (Energy Management System) 40. The EMS 40 is an example of a central control device.

The power converters 11, 12 and 13 are DC/DC converters and the power converter 14 is an AC/DC converter. The power converters 11, 12, 13 and 14 have a function of performing information communication in a wired or wireless manner. The configurations and functions of the power converters 11, 12, 13 and 14 will be described below.

The bus 30 is a DC bus in the power system 100 and is connected to the power converters 11, 12, 13 and 14. In the power system 100, a power network including a DC grid is built.

The power element 21 is, for example, a stationary power storage device capable of supplying power, consuming power, and charging and is connected to the power converter 11. The stationary power storage device is an example of a facility internal power storage device that is permanently installed. The power converter 11 has a function of converting the voltage of a DC power that the power element 21 supplies and outputting the converted voltage to the bus 30 and converting the voltage of a DC power that is supplied from the bus 30 and outputting the converted voltage to the power element 21 to charge the power element 21.

The power element 22 is, for example, a photovoltaic device capable of generating and supplying power and is connected to the power converter 12. The photovoltaic device is an example of a power generation device that generates power using renewable energy. The power converter 12 has a function of converting the voltage of a DC power that the power element 22 supplies and outputting the converted voltage to the bus 30.

The power element 23 is, for example, an in-vehicle power storage device capable of supplying power, consuming power, and charging and is connected to the power converter 13. The in-vehicle power storage device is installed in an electric vehicle EV and is an example of a non-stationary power storage device that generates power using renewable energy. The power converter 13 has a function of converting the voltage of a DC power that the power element 23 supplies and outputting the converted voltage to the bus 30 and converting the voltage of a DC power that is supplied from the bus 30 and outputting the converted voltage to the power element 23 to charge the power element 23. The power converter 13 is provided in, for example, a charge station or a home charging facility, and the power converter 13 may be installed in an electric vehicle EV.

The power element 24 is, for example, a commercial power system and is connected to the power converter 14. The power converter 14 converts an AC power that the power element 24 supplies into a DC power and outputs the DC power to the bus 30 and converts a DC power that is supplied from the bus 30 into an AC power and outputs the AC power to the power element 24. The output of power from the bus 30 to the power element 24 is also referred to as a backfeeding.

The EMS 40 has a function of managing the state of the power system 100 in an integrated manner. The EMS 40 includes a controller 41, a storage unit 42, and a communication unit 43.

The controller 41 perform various arithmetic processing for implementing a function of the EMS 40 and, for example, is configured by including a processor, such as a CPU (Central Processing Unit), an ASIC (Application Specific Integrated Circuit), a FPGA (Field-Programmable Gate Array), a DSP (Digital Signal Processor), or a GPU (Graphics Processing Unit). The controller 41 reads various programs from the storage unit 42 and executes the programs and accordingly the function of the controller 41 is implemented as a function unit.

The storage unit 42 includes, for example, a ROM (Read Only Memory) in which various programs and data that the controller 41 uses for performing arithmetic processing are stored. The storage unit 42 includes, for example, a RAM (Random Access Memory) that is used for storing a work space for the controller 41 to perform arithmetic processing, the result of arithmetic processing performed by the controller 41, etc. The storage unit 42 may include an auxiliary storage device, such as a HDD (Hard Disk Drive) or a SSD (Solid State Drive).

The communication unit 43 is configured by including a communication module that performs information communication in a wired or wireless manner. The communication unit 43 performs information communication with the power converters 11, 12, 13 and 14 and an external server 200 via a network NW configured of an Internet network or a mobile phone network.

The external server 200 is a server that is provided outside the power system 100. The external server 200 is, for example, an information processing device that is configured to function as an EMS in another power system or an information processing device that includes a database and that functions as a data server to the EMS 40. The external server 200 stores various types of information that would possibly have an effect on operation of the power system 100.

Configuration of Power Converter

Figure 12:
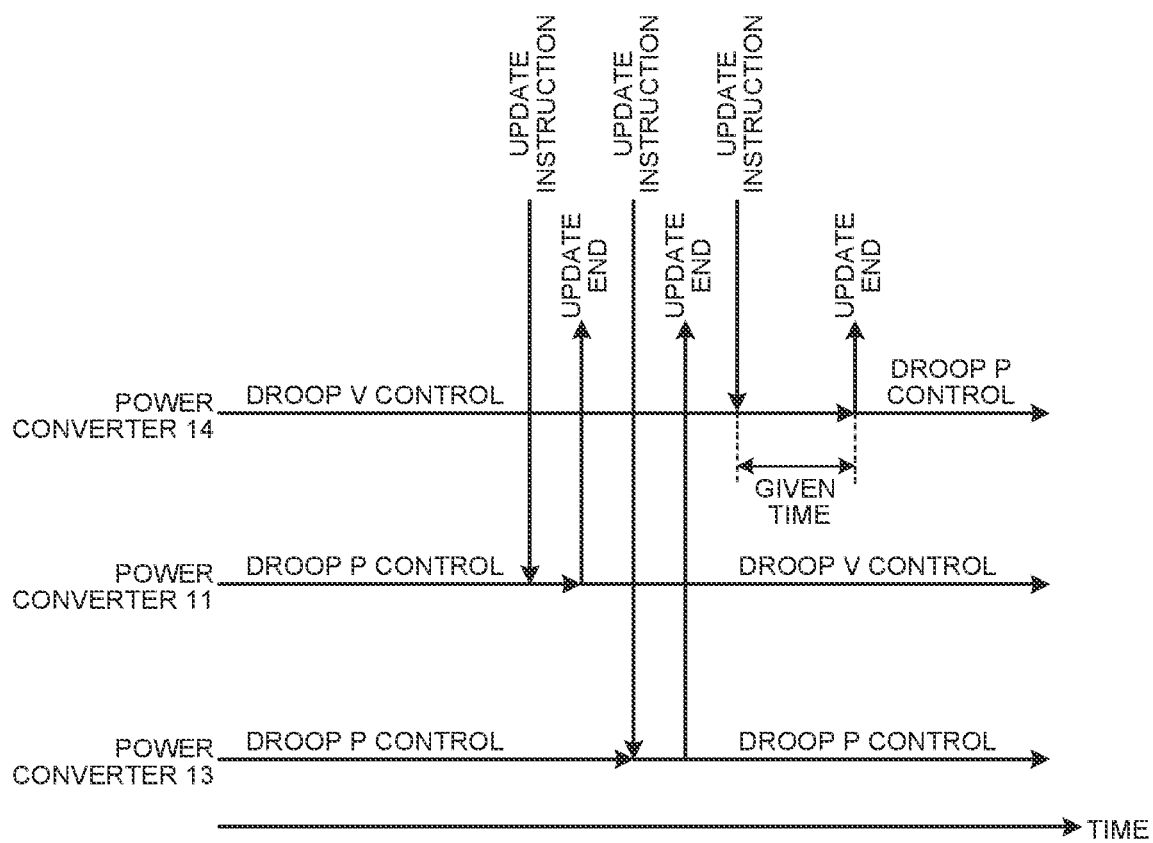
FIG. 12 is a diagram illustrating timing at which reference function information and a feedback control method are updated in the power converter according to the second embodiment.

A specific configuration of the power converter 11 will be described next. FIG. 12 is a diagram illustrating a configuration of the power converter 11. The power converter 11 includes a power conversion unit 11*a*, a sensor 11*b*, a controller 11*c*, and a communication unit 11*d*.

The power conversion unit 11*a* performs DC/DC conversion of converting the voltage of a DC power that is input from the power element 21 that is discharging electricity and outputting the converted voltage to the bus 30. The power conversion unit 11*a* is also able to convert the voltage of a DC power that is input from the bus 30 and output the converted voltage to the power element 21 to charge the power element 21. The power conversion unit 11*a* consists of an electric circuit including, for example, a coil, a capacitor, a diode, and a switching element. The switching element is, for example, a field effect transistor or an insulated gate bipolar transistor. It is possible to control a power conversion property of the power conversion unit 11*a* by PWM (Pulse Width Modulation) control.

The sensor 11*b* measures electrical characteristics of power of the power conversion unit 11*a* on the side of the bus 30. Accordingly, the sensor 11*b* measures electrical characteristics of a power that is input to the power converter 11 or that is output from the power converter 11. The sensor 11*b* is able to measure a current value, a voltage value, a power value, etc. The sensor 11*b* is an example of a measurement unit that acquires a measured value. The sensor 11*b* outputs the measured value of the electric characteristics to the controller 11*c*.

The controller 11*c* is configured by including a processor that performs various types of arithmetic processing for controlling the operation of the power conversion unit 11*a* and a storage unit in order to mainly implement a power converting function of the power converter 11. What exemplified as the configurations of the controller 41 and the storage unit 42 are usable as the processor and the storage unit, respectively. The processor reads various programs from the storage unit and executes the programs and accordingly the function of the controller 11*c* is implemented as a function unit. For example, the controller 11*c* controls the power conversion property of the power conversion unit 11*a* based on a reference function. Specifically, the controller 11*c* outputs a PWM signal containing information on an amount of operation (for example, a duty ratio) for PWM control to the power conversion unit 11*a* and performs PWM control on the power conversion unit 11*a*. The controller 11*c* may output the amount of operation to the power conversion unit 11*a* directly or to the power conversion unit 11*a* via another function unit (for example, a loop controller) not illustrated in the drawing.

The communication unit 11*d* is configured by including a communication module that performs information communication in a wired or wireless manner and a communication controller that controls operations of the communication module. The communication unit 11*d* performs information communication with the EMS 40 via the network NW. The communication unit 11*d* receives information and instructions from, for example, the EMS 40 and outputs the information and instructions to the controller 11*c*. The communication unit 11*d*, for example, transmits information on a power status that is input from the controller 11*c* to the EMS 40. Note that, when information on the power status is a measure value of the sensor 11*b*, for example, the communication unit 11*d* may transmit the measured value that is input from the sensor 11*b* to the EMS 40.

Figure 3:
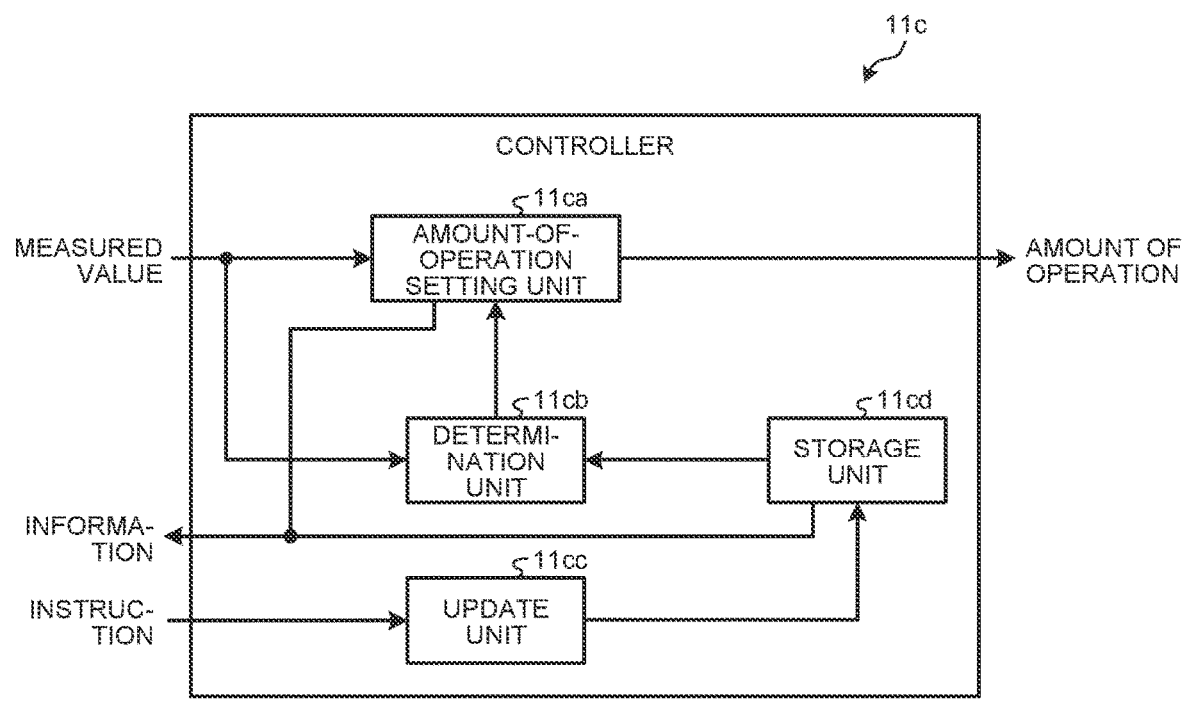
FIG. 3 is a diagram illustrating a configuration of a controller illustrated in FIG. 2.

FIG. 3 is a diagram illustrating a configuration mainly according to the power converting function of the controller 11*c*. The controller 11*c* includes an amount-of-operation setting unit 11*ca*, a determination unit 11*cb*, an update unit 11*cc*, and a storage unit 11*cd* serving as the function unit that is implemented as software by execution of the program.

The update unit 11*cc* stores, in the storage unit 11*cd*, reference function information and control method information that are contained in an update instruction that is input from the communication unit 11*d* and updates the reference function information and the control method information that are stored in the storage unit 11*cd*. The reference function information is various types of information for specifying droop functions constituting the reference function, which will be described in detail below.

The determination unit 11*cb* determines a method of feedback control that the amount-of-operation setting unit 11*ca* is to perform based on the control method information that is stored in the storage unit 11*cd* and outputs the result of the determination as determination information. There are, as the method of feedback control, feedback control (referred to as droop P control below) of determining a target power Pref (an example of a target value) based on a measured value Vo of voltage measured by the sensor 11*b* and the reference function information and setting an amount of operation such that the difference between Pref and a measured value Po of power (an example of a value to be controlled) measured by the sensor 11*b* is within or under an allowable range; and feedback control (referred to as droop V control below) of determining a target voltage Vref (an example of a target value) based on a measured value Po of power measured by the sensor 11*b* and the reference function information and setting an amount of operation such that the difference between Vref and the measured value Vo of voltage (an example of the value to be controlled) measured by the sensor 11*b* is within or under an allowable range. The droop P control that is an example of power control and the droop V control that is an example of voltage control are an example of a control method of controlling an output of the power conversion unit 11a. The control method information described above is information presenting the droop P control or the droop V control and the determination unit 11cb determines a method of feedback control based on the control method information that is stored in the storage unit 11cd and outputs a result of the determination indicating that the droop P control is to be performed or a result of the determination indicating that the droop V control is to be performed as the determination information.

The amount-of-operation setting unit 11ca sets a method of feedback control according to the determination information that is input from the determination unit 11cb, sets an amount of operation based on the measured value that is input from the sensor 11b and the reference function information that is acquired from the storage unit 11cd, and outputs the amount of operation to the power conversion unit 11a. Note that feedback control that the amount-of-operation setting unit 11ca performs may be executed using, for example, a known method, such as PID control that is executed by reading parameters, such as a proportional gain, an integration time, and a derivative time, that are stored in the storage unit 11cd.

The storage unit 11cd or the amount-of-operation setting unit 11ca output information, such as information on the power status and the reference function information, to the communication unit 11d.

Note that other power converters 12, 13 and 14 may have a configuration similar to that of the power converter 11. Note that the power conversion unit 11a of the power converter 14 is, a so-called inverter that converts an AC power that is input from the power element 24 into a DC power and outputs the DC power to the bus 30 and converts a DC power that is input from the bus 30 into an AC power and outputs the AC power to the power element 24.

Property of Reference Function

The reference function based on which the controller 11c controls the power conversion property of the power conversion unit 11a will be described next. FIGS. 4A to 4D are diagrams illustrating an example of the power conversion property.

Figure 4A:
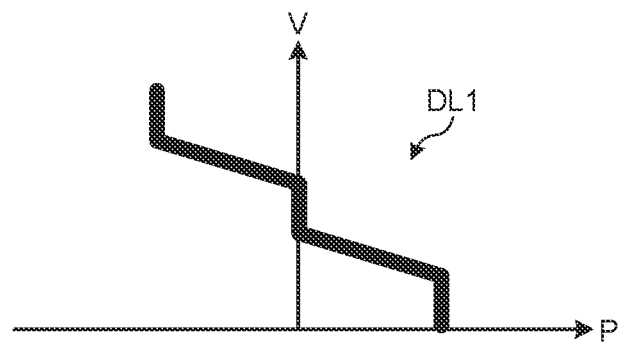
FIG. 4A is a diagram illustrating an example of a power conversion property.

FIG. 4A is a diagram illustrating a V-P property that is a relationship between the power (P) and the voltage (V) of the power conversion unit 11a that the power converter 11 includes on the side of the bus 30 and illustrates a power conversion property of the power conversion unit 11a that the power converter 11 includes. Note that P is a positive value when the power conversion unit 11a supplies power to the bus 30, that is, when the power element 21 is discharging electricity and is a negative value when power is supplied from the bus 30, that is, when the power element 21 is discharging electricity.

The line DL1 illustrated in FIG. 4A is a liner or curved line that bends in the middle. The reference function represented by the line DL1 is formed by connecting a plurality of droop functions that are defined according to intervals of input values and whose drooping characteristics are different from one another. Specifically, the line DL1 is formed by connecting lines representing five droop functions whose drooping characteristics are different from one another and is specified by the reference function information. In the reference function information, for example, coordinate information on the borders of the droop functions in a coordinate system, where the horizontal axis is P and the vertical axis is V, segment information on the droop functions, information on the slopes (that is, dropping coefficients), and information on the shape (such as a straight line or a curved line) are contained. In the power converter 11, the controller 11c controls the power conversion property of the power conversion unit 11a to realize the property of the reference function that is represented by the line DL1. In other words, the controller 11c of the power converter 11 controls the power conversion unit 11a such that the operating point that is defined by the value of V and the value of P is positioned on the line DL1.

Figure 4B:
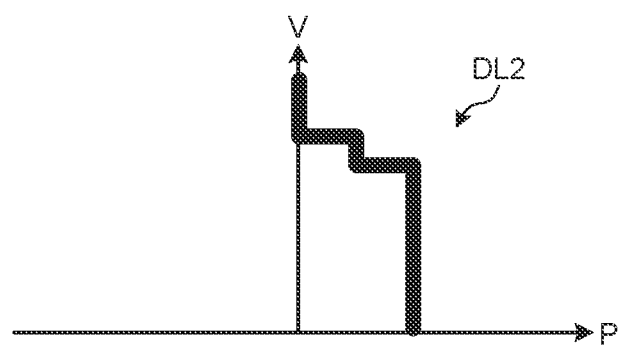
FIG. 4B is a diagram illustrating an example of the power conversion property.

FIG. 4B is a diagram illustrating a V-P property that is a relationship between the power (P) and the voltage (V) of the power conversion unit 11a that the power converter 12 includes on the side of the bus 30 and illustrates a power conversion property of the power conversion unit 11a that the power converter 12 includes.

The line DL2 illustrated in FIG. 4B is a liner or curved line that bends in the middle. The reference function represented by the line DL2 is formed by connecting lines representing five droop functions that are defined according to intervals of input values and whose drooping characteristics are different from one another and the line DL2 is specified by the reference function information as the line DL1 is. In the power converter 12, the controller 11c controls the power conversion property of the power conversion unit 11a to realize the property of the reference function that is represented by the line DL2. In other words, the controller 11c of the power converter 12 controls the power conversion unit 11a such that the operating point that is defined by the value of V and the value of P is positioned on the line DL2.

Figure 4C:
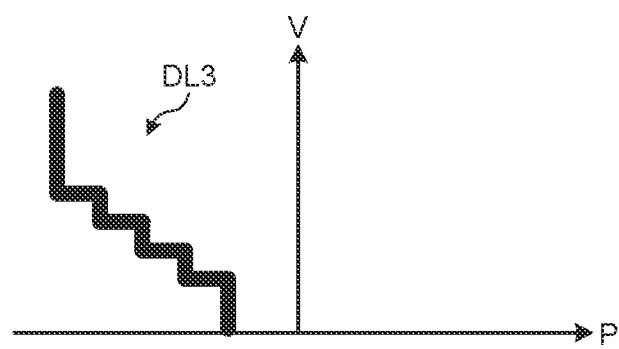
FIG. 4C is a diagram illustrating an example of the power conversion property.

FIG. 4C is a diagram illustrating a V-P property that is a relationship between the power (P) and the voltage (V) of the power conversion unit 11a that the power converter 13 includes on the side of the bus 30 and illustrates a power conversion property of the power conversion unit 11a that the power converter 13 includes.

The line DL3 illustrated in FIG. 4C is a liner or curved line that bends in the middle. The reference function represented by the line DL3 is formed by connecting lines representing nine droop functions that are defined according to intervals of input values and whose drooping characteristics are different from one another and the line DL3 is specified by the reference function information as the line DL1 is. In the power converter 13, the controller 11c controls the power conversion property of the power conversion unit 11a to realize the property of the reference function that is represented by the line DL3. In other words, the controller 11c of the power converter 13 controls the power conversion unit 11a such that the operating point that is defined by the value of V and the value of P is positioned on the line DL3.

Figure 4D:
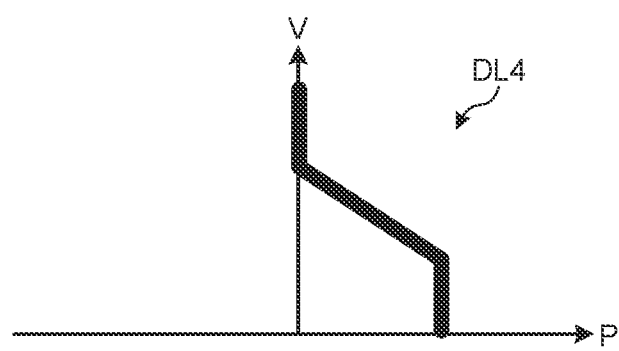
FIG. 4D is a diagram illustrating an example of the power conversion property.

FIG. 4D is a diagram illustrating a V-P property that is a relationship between the power (P) and the voltage (V) of the power conversion unit 11a that the power converter 14 includes on the side of the bus 30 and illustrates a power conversion property of the power conversion unit 11a that the power converter 14 includes.

The line DL4 illustrated in FIG. 4D is a liner or curved line that bends in the middle. The reference function represented by the line DL4 is formed by connecting lines representing three droop functions that are defined according to intervals of input values and whose drooping characteristics are different from one another and the line DL4 is specified by the reference function information as the line DL1 is. In the power converter 14, the controller 11c controls the power conversion property of the power conversion unit 11a to realize the property of the reference function that is represented by the line DL4. In other words, the controller 11c of the power converter 14 controls the power conversion unit 11a such that the operating point that is defined by the value of V and the value of P is positioned on the line DL4.

Control Method

A method of controlling the power converters 11, 12, 13 and 14 and a method of controlling the power system 100 will be described next. In the power system 100, what is referred to as self-terminal control in which the power converters 11, 12, 13 and 14 perform control in an autonomous-decentralized manner individually and centralized control in which the EMS 40 performs collaborative control on the power converters 11, 12, 13 and 14 according to the power status of the power system 100 may be executed. For example, the self-terminal control is executed repeatedly in a relatively short period and the centralized control is executed at intervals longer than the period of the self-terminal control. The self-terminal control is also referred to as primary control and the centralized control is also referred to as secondary control. A program causes the processor to execute these control methods in each of the power converters or the EMS 40.

Self-Terminal Control

First of all, the method of controlling the power converters 11, 12, 13 and 14 in the self-terminal control will be described, with the power converter 11 being exemplified as an example. Also in other power converters 12, 13 and 14, a similar control method to that according to the following description may be executed as appropriate. Note that, in the case where the power element 22 is an element that does not control the amount of power generation in view of efficiency, etc., such as a photovoltaic device, when a power corresponding to the amount of power generation is input from the power element 22, the power converter 12 may execute control according to a MPPT (Maximum Power Point Tracking) system that causes an operation such that the power output to the bus 30 is at maximum with the amount of power generation. For example, FIG. 4B is an example of the reference function at the time when the control according to the MPPT system.

In the method of controlling the power converter 11, the controller 11c executes a control step of controlling the power conversion property of the power converter 11, that is, the power conversion property of the power conversion unit 11a based on the reference function.

An example of the content of the control step will be described more in detail with reference to FIG. 3 and FIG. 5. FIG. 5 is a flowchart illustrating a flow of the process performed by the controller 11c.

First of all, in the controller 11c, the amount-of-operation setting unit 11ca acquires a measured value from the sensor 11b (step S101). Subsequently, in the controller 11c, the amount-of-operation setting unit 11ca acquires reference function information from the storage unit 11cd (step S102). Subsequently, in the controller 11c, the determination unit 11cb determines a method of feedback control based on the control method information that is stored in the storage unit 11cd (step S103). Subsequently, in the controller 11c, the amount-of-operation setting unit 11ca acquires determination information that is output from the determination unit 11cb, sets an amount of operation for executing feedback control in the control method based on the acquired determination information, and outputs the amount of operation to the power conversion unit 11a (step S104). Accordingly, control on the power conversion unit 11a is executed.

Centralized Control

The centralized control will be described next. In the example illustrated below, the EMS 40 that is provided outside the power converters 11, 12, 13 and 14 executes the centralized control by updating the reference function and the feedback control method that the power converters 11, 12, 13 and 14 use for control. Updating the reference function and the feedback control method by an instruction means that the instruction contains the reference function information on the reference function and the control method information on the feedback control method and part of or all the reference function and the feedback control method are updated according to the instruction. The storage unit 11cd of each of the power converters 11, 12, 13 and 14 stores the reference function information and the control method information such that they are updatable.

For example, in information communication between the EMS 40 and the power converters 11, 12, 13 and 14, the reference function information and the control method information are contained in an instruction signal for updating the reference function. As described above, the reference function information is the coordinate information on the borders of the droop functions, the segment information on the droop functions, the information on the slopes (that is, dropping coefficients), and the information on the shape (such as a straight line or a curved line). The control method information is information presenting the droop P control or the droop V control. The reference function information that is used for update is stored in the storage unit 42 of the EMS 40 and the controller 41 reads and uses the reference function information as appropriate.

An example of the method of controlling the power system 100 will be described as the centralized control with reference to the sequence chart in FIG. 6.

First of all, the EMS 40 calls its timer and starts counting (step S201). Subsequently, the EMS 40 requests each of the power converters 11, 12, 13 and 14 for self-terminal count information (step S202). The self-terminal count information is an example of the information on the power status of the power system 100 and contains the measured values that are measured by the sensors of the respective power converters 11, 12, 13 and 14 and the times of measurement.

Subsequently, each of the power converters 11, 12, 13 and 14 transmits the self-terminal count information to the EMS 40 (step S203). The EMS 40 stores each of the sets of self-terminal count information in the storage unit 42.

Subsequently, the EMS 40 requests the external server 200 for the various types of information that would possibly have an effect on operation of the power system 100 (step S204). In the example, the EMS 40 requests the external server 200 for amount-of-power-generation demand-forecast information. The amount-of-power-generation demand-forecast information contains information on forecast of the amount of power generation in the power system 100 and information on forecast of a demand for power and, for example, the information may contain information on the season and the current weather in the area in which the power system 100 is set, future weather, etc. In the case where the external server 200 functions as an EMS of another power system, when the state of operation of the another power system would possibly have an effect on operation of the power system 100, the amount-of-power-generation demand-forecast information may contain information on forecast of the amount of power generation in the another power system and information on forecast of a demand for power.

Subsequently, the external server 200 transmits the amount-of-power-generation demand-forecast information to the EMS 40 (step S205). The EMS 40 stores the amount-of-power-generation demand-forecast information in the storage unit 42.

Subsequently, the controller 41 of the EMS 40 reads each of the transmitted sets of information, that is, the information on the power status of the power system 100, etc., from the storage unit 42 and, based on the information, executes an operation optimization calculation on the power system 100 (step S206).

The operation optimization calculation is executed to be applied to various conditions. For example, assume that the power system 100 is controlled such that the bus 30 is at an operation point of a given voltage. In this state, assume that the EMS 40 determines that it is expected that the future weather in the area in which the power element 22, which is a photovoltaic device, will be sunny and the amount of power generation will increase according to the amount-of-power-generation demand-forecast information and the power element 22 may afford the power supply from the self-terminal count information that is acquired from the power converter 12 that is connected to the power element 22. In this case, the EMS 40 determines to update the reference function of the power converter 11 that is connected to the power element 21 such that the power element 21, which is the stationary power storage device, is charged at the operation point. Simultaneously with the update, the EMS 40 determines to update the reference function of the power converter 14 that is connected to the power element 24 such that power is not supplied from the power element 24 that is the commercial power system.

It is possible to make a condition setting for the operation optimization calculation in view of not exceeding contacted power of the power element 24 that is the commercial power system, such as a peak cut or utilization of nigh-time power, and also in view of optimization of the power rate and execute the operation optimization calculation.

The storage unit 42 of the EMS 40 stores a trained model, and the EMS 40 may execute the operation optimization calculation using the trained model. For example, it is possible to use, as the trained model, a trained model that is generated by deep learning using a neural network in which the information on the power status of the power system 100 and results of switching and updating the reference functions for the power converters 11, 12, 13 and 14 that correspond to the information on the power status serve as training data.

The EMS 40 sets reference function information and control method information that are suitable for a power converter on which an update is to be made among the power converters 11, 12, 13 and 14 based on the result of the operation optimization calculation and outputs an instruction to update the reference function (droop functions) containing the reference function information and the control method information that are set and the feedback control method (step S207). The EMS 40 then resets the timer (step S208).

The power converter on which an update is to be made among the power converters 11, 12, 13 and 14 acquires an instruction to update the reference function and update the feedback control method and updates the reference function and the feedback control method (step S209).

FIG. 7 is a flowchart illustrating a flow of a process of updating a reference function and a feedback control method that the power converter performs. In the controller 11c of the power converter that receives the update instruction, the update unit 11cc refers to the control method information that is stored in the storage unit 11cd and determines whether the feedback control method before the update is the droop V control (step S301).

When the control method presented by the control method information before the update is the droop P control (NO at step S301), the controller 11c goes to step S303. When the control method presented by the control method information before the update is the droop V control (YES at step S301), the controller 11c determines whether a given time elapses after acquisition of the update instruction (step S302). When the given time does not elapse after acquisition of the update instruction (NO at step S302), the controller 11c repeats the process at step S302 until the given time lapses. When the given time elapses after acquisition of the update instruction (YES at step S302), the controller 11c updates the reference function information and the control method information that are stored in the storage unit 11cd with the reference function information and the control method information that the received update instruction contains (step S303).

Back to FIG. 6, subsequently, each of the power converters 11, 12, 13 and 14 executes the self-terminal control (step S210). The power converter having received the update instruction among the power converters 11, 12, 13 and 14 performs the self-terminal control by the reference function and the feedback control method that are updated. The self-terminal control is self-terminal control reflecting the power status of the power system 100 and the power converters 11, 12, 13 and 14 are controlled collaboratively.

Figure 8A:
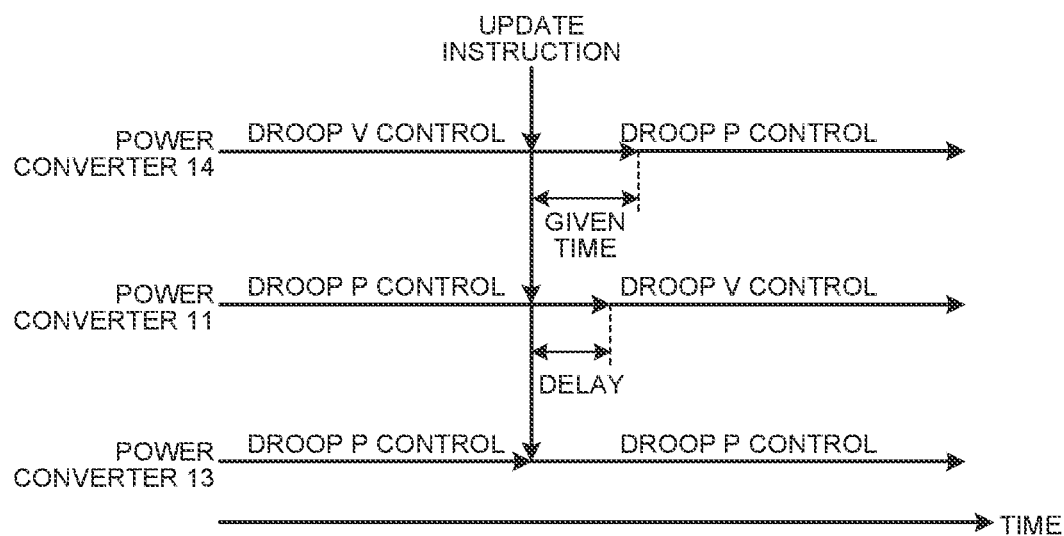
FIG. 8A is a diagram illustrating timing at which reference function information and a feedback control method are updated in the power converter.

FIG. 8A is a diagram illustrating timing at which the reference function information and the feedback control method are updated in the power converter having received the update instruction. In order to compare with the present embodiment, timing at which the reference function information and the feedback control method are updated in the case where the power converter on which an update is to be made does not perform the process in FIG. 7 is illustrated in FIG. 8B.

Figure 8B:
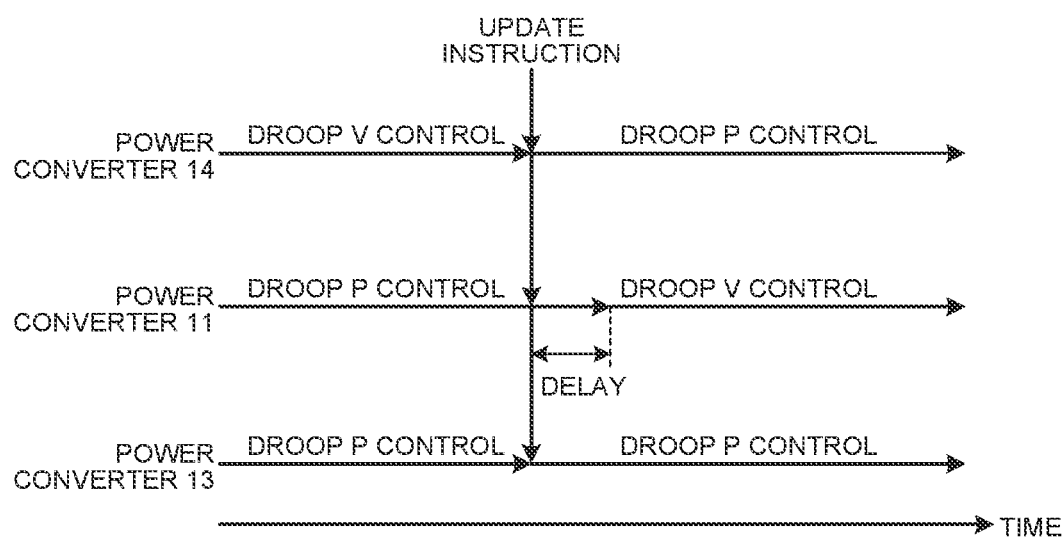
FIG. 8B is a diagram illustrating timing at which the reference function information and the feedback control method are updated in the power converter.

As illustrated in FIG. 8B, when an update of the power converter 11 that is an update from the droop P control to the droop V control is behind an update of the power converter 14 that is an update from the droop V control to the droop P due to, for example, a delay in communication, there is a state in which there is no converter that performs the droop V control in the period of the delay and, in the bus 30, there is a risk of an unintentional increase in voltage or an unintentional decrease in voltage.

On the other hand, in the present embodiment, because the power converter having received the update instruction performs the process in FIG. 7 and accordingly the power converter 14 that makes an update from the droop V control to the droop P control updates the control method after the given time elapses after reception of the update instruction, as illustrated in FIG. 8A, even when the update from the droop P control to the droop V control delays in the power converter 11, there is the state in which there is a power convert that performs the droop V control and, in the bus 30, it is possible to inhibit occurrence of an unintentional increase in voltage or an unintentional decrease in voltage.

Second Embodiment

A second embodiment of the present disclosure will be described next. A power system according to the second embodiment is different from that of the first embodiment in a method of centralized control and a method of updating a reference function and a feedback control method. Other configurations are the same as those of the first embodiment and thus the same reference numerals are assigned with respect to the same configurations as those of the first embodiment and description thereof will be omitted and differences from the first embodiment will be described in the following description.

Figure 9:
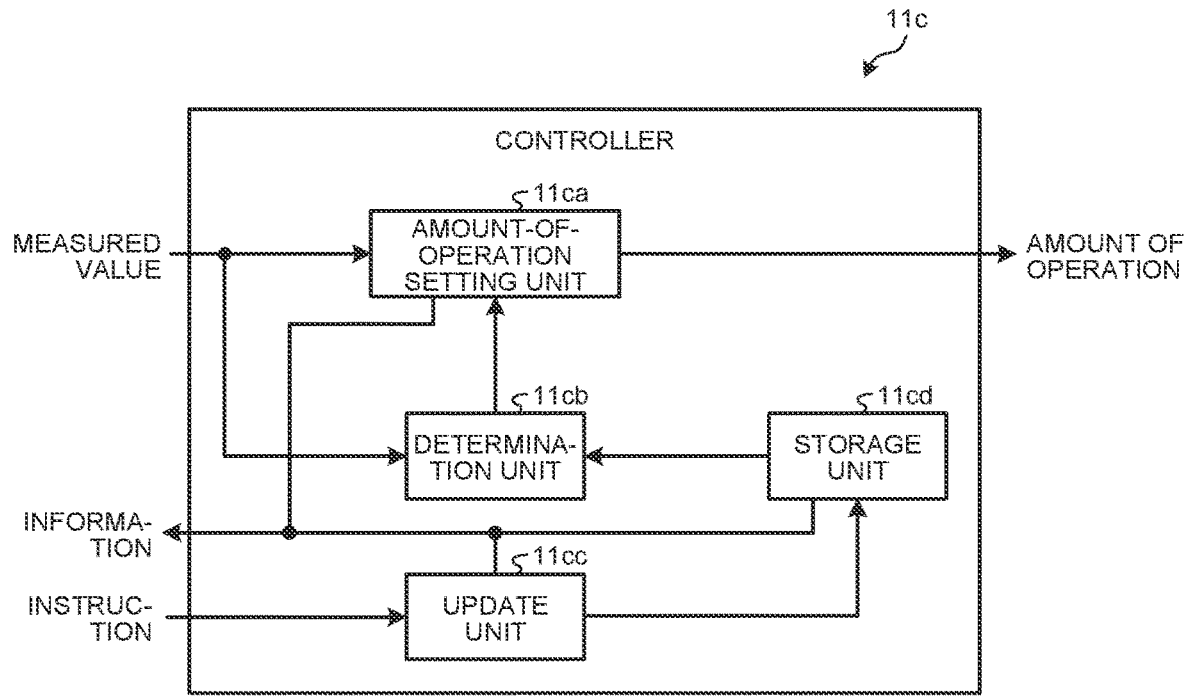
FIG. 9 is a diagram illustrating a configuration of a controller of a power converter according to a second embodiment.

FIG. 9 is a diagram mainly illustrating a configuration according to a power conversion function of the controller 11c according to the second embodiment. The controller 11c according to the second embodiment is different from the controller 11c according to the first embodiment in that the update unit 11cc outputs information indicating that updating the reference function and the feedback control method completes to the communication unit 11d.

Figure 10:
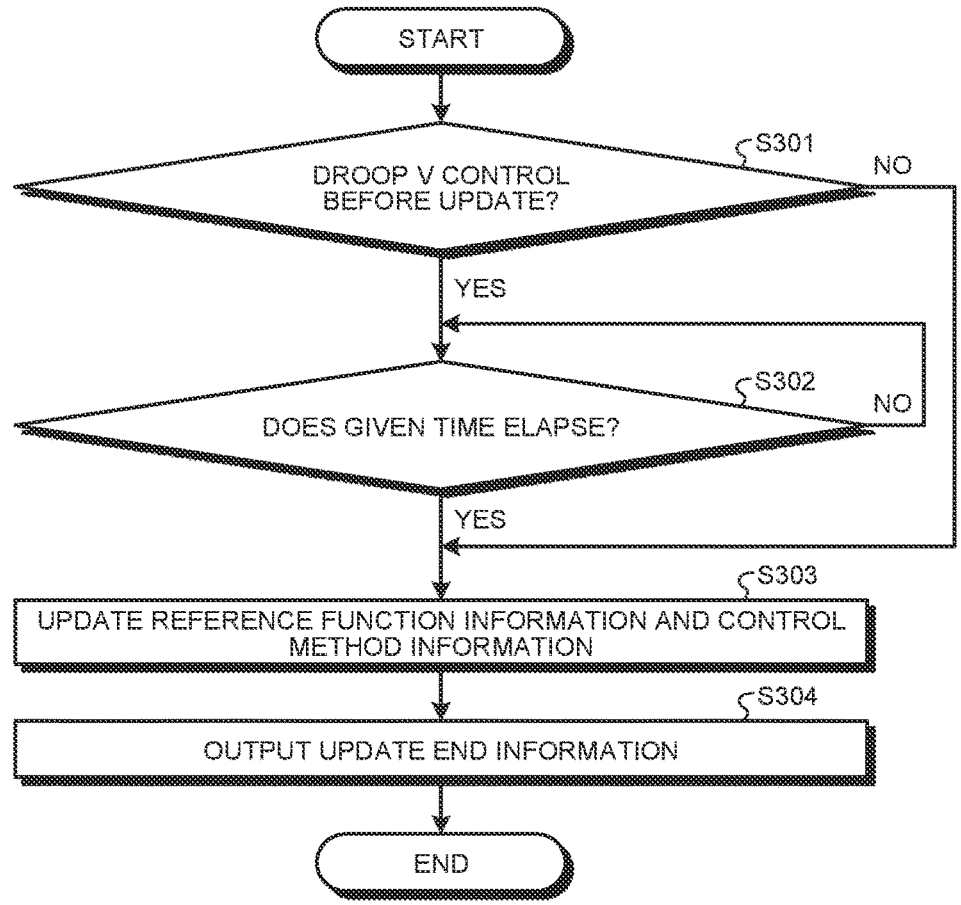
FIG. 10 is a flowchart illustrating a flow of a process that the controller of the power converter performs according to the second embodiment.

FIG. 10 is a flowchart illustrating a flow of a process of updating the reference function and the feedback control method that a power converter on which an update is to be made performs in the second embodiment. Note that the process from step S301 to step S303 is the same as that of the first embodiment and therefore description thereof will be omitted. After ending the process at step S303, the controller 11c outputs update end information indicating that the process of updating the reference function and the feedback control method ends to the communication unit 11d (step S304). The update end information is transmitted from the communication unit 11d to the EMS 40.

Figure 11:
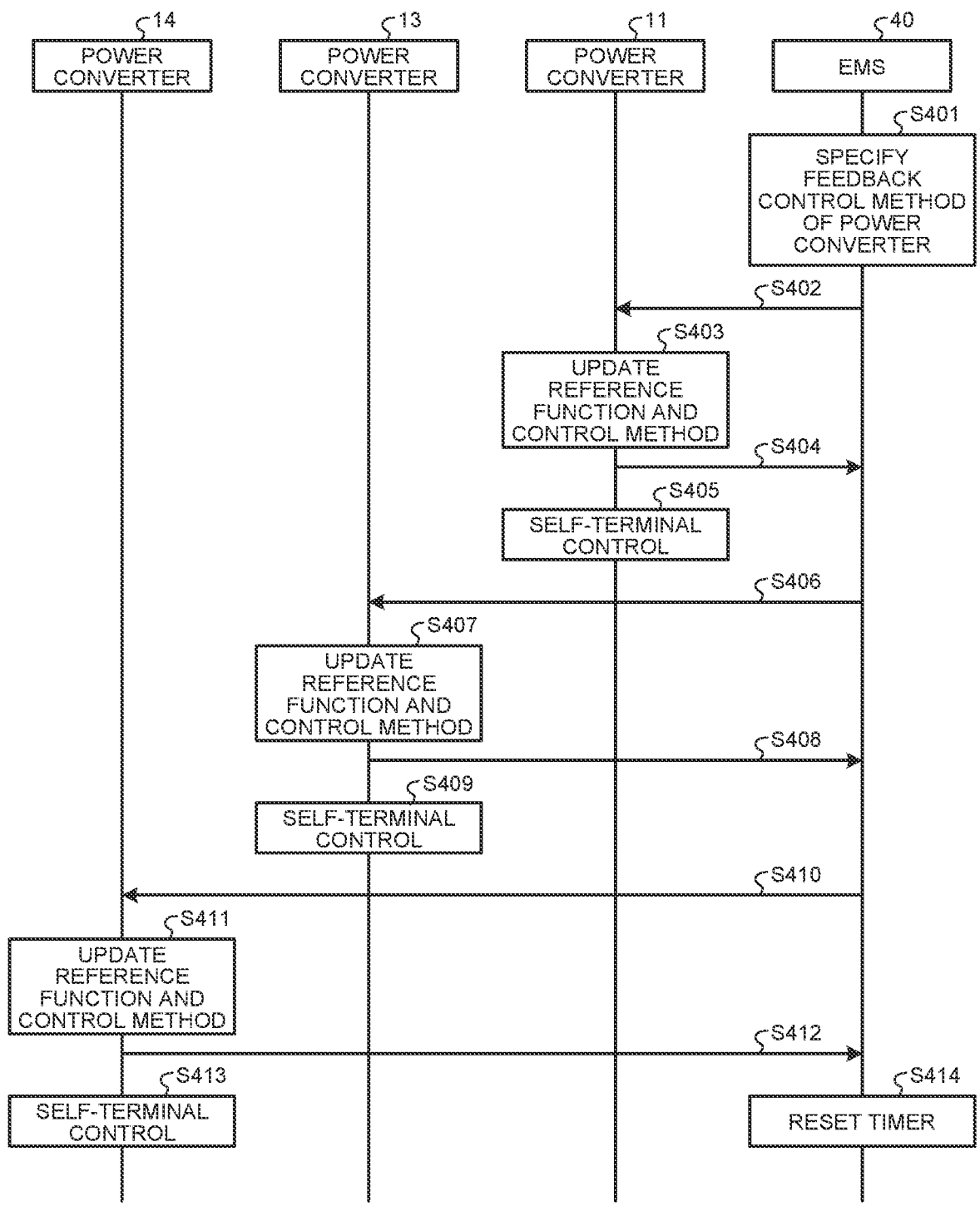
FIG. 11 is a sequence chart illustrating an example of a method of controlling a power system according to as second embodiment.

Centralized control in the second embodiment will be described next using the sequence chart in FIG. 11. In the centralized control in the second embodiment, the process from step S201 to step S206 illustrated in FIG. 6 completes before step S401 illustrated in FIG. 11.

After executing the operation optimization calculation, the EMS 40 outputs an update instruction to a power converter whose reference function and feedback control method are to be updated. Specifically, the EMS 40 stores information presenting feedback control methods that the power converters 11 to 14 are executing in the storage unit 42, refers to the information, and specifies a feedback control method that the power converter on which an update is to be made is executing (step S401). Here, for example, it is specified that the power converter 11 and the power converter 13 are executing the droop P control and the power converter 14 is executing the droop V control.

The EMS 40 then, first of all, outputs an instruction to update the reference function (droop functions) and the feedback control method to the power converter 11 that is executing the droop P control (step S402). The EMS 40 does not output an update instruction to another power converter on which an update is to be made until the EMS 40 receives update end information that is transmitted from the power converter 11. The power converter 11 having received the update instruction executes the process in FIG. 10 and updates the reference function and the feedback control method (step S403). On ending updating the reference function and the feedback control method, the power converter 11 transmits the update end information to the EMS 40 (step S404) and executes the self-terminal control (step S405).

The EMS 40 having received the update end information that the power converter 11 has transmitted similarly outputs an instruction of updating the reference function (droop functions) and the feedback control method to the power converter 13 that is executing the droop P control (step S406). The EMS 40 does not output an update instruction to another power converter on which an update is to be made until the EMS 40 receives the update end information that is transmitted from the power converter 11. The power converter 13 having received the update instruction executes the process in FIG. 10 and updates the reference function and the feedback control method (step S407). On ending updating the reference function and the feedback control method, the power converter 13 transmits the update end information to the EMS 40 (step S408) and executes the self-terminal control (step S409).

On ending outputting an update instruction to the power converter executing the droop P control, the EMS 40 having received the update end information that the power converter 13 has transmitted then outputs an instruction to update the reference function (droop functions) and the feedback control method to the power converter 13 that is executing the droop V control (step S410). The power converter 14 having received the update instruction executes the process in FIG. 10 and updates the reference function and the feedback control method (step S411). On ending updating the reference function and the feedback control, the power converter 14 transmits update end information to the EMS 40 (step S412) and executes the self-terminal control (step S413). Subsequently, the EMS 40 having received the update end information that the power converter 14 has transmitted resets the timer (step S414).

FIG. 12 is a diagram illustrating timing at which the reference function information and the feedback control method are updated in the power converter that has received the update instruction. In the second embodiment, because the EMS 40 outputs an instruction to make an update to the droop P control to the power converter 14 that is executing the droop V control after the power converter 11 executing the droop P control ends the update to the droop V control, there is a state in which there is always a power converter that performs the droop V control and it is possible to inhibit occurrence of an unintentional increase in voltage or an unintentional decrease in voltage in the bus 30.

In the second embodiment, when an instruction to make an update to the droop P control is output to a power converter that is executing the droop V control, the power converter executing the droop P control has ended the update to the droop V control and there is a state in which there is the power converter that executes the droop V control and therefore a configuration in which the process of step S301 and step S302 are not executed may be employed.

Modification

The embodiments of the present disclosure have been described; however, the disclosure is not limited to the embodiment described above, and the disclosure may be carried out in other various modes. For example, the disclosure may be carried out by modifying the above-described embodiment as follows. The above-described embodiments and the modifications below may be combined. What configured by combining components of each of the above-described embodiments and each modification as appropriate is covered by the disclosure. Further effects and modifications may be led by those skilled in the art easily. Thus, modes of the disclosure in a wide range are not limited to the above-described embodiments and modifications and various change may be made.

In the above-described embodiments, current values may be used instead of the power values as electrical characteristics, such as measured values, target values, and values to be controlled. In this case, for example, a reference function is defined as a V-I property that is a relationship between the current (I) and the voltage (V). For example, feedback control in which the controller 11c determines a target power Iref (an example of the target value) based on a measured value Vo of voltage measured by the sensor 11b and the reference function information and sets an amount of operation such that the difference between Iref and a measured value Io of current (an example of a value to be controlled) measured by the sensor 11$b$ is within or under an allowable range is also referred to as droop I control and is executed instead of the droop P control. In the droop V control, a target voltage Vref is determined based on the measured value Io of current measured by the sensor 11$b$ and the reference function information.

In the above-described embodiments, sets of reference function information that are different from one another may be stored in the storage unit 11$cd$ and the reference function information that the amount-of-operation setting unit 11$ca$ uses among the stored sets of reference function information may be switched according to an instruction from the EMS 40.

In the first embodiment described above, as in the second embodiment, first of all, an update instruction may be output to a power converter that is executing the droop P control and then an update instruction may be output to a power converter that is executing the droop V control.

In each of the above-described embodiments, the feedback control that each of the power converters performs is not limited to the droop V control or the droop P control based on the reference function, and the feedback control may be constant voltage control of making the voltage constant or constant power control of making the power constant. The constant voltage control that is an example of voltage control and the constant power control that is an example of power control are examples of the control method of controlling the output of the power conversion unit 11$a$.

The present disclosure may be used for a power system and a method of controlling a power system.

According to a power system of the present disclosure, on a plurality of power converters including a power conversion unit that converts a power that is input and outputs the converted power, a controller that controls the power conversion unit and executes control on the output that is primary control based on a reference function having a drooping characteristic defined according to an input value and a voltage or a power of a bus to which the power conversion unit is connected, and an update unit that updates a control method on the output, a central control device that executes secondary control of controlling the power converter performs secondary control on the power converter according to an update instruction to update the control method, the update unit updates the control method according to the update instruction that is output from the central control device, and the control method is updated such that there is always at least one of the power converters that performs voltage control in a period in which the power converters update the control method and therefore, when the control method is updated, the voltage of the bus to which the power converter is connected is controlled by at least one of the power converters that perform voltage control and it is possible to inhibit occurrence of an unintentional increase in voltage or an unintentional decrease in voltage in the bus.

According to a method of controlling a power system of the present disclosure, in the power system that is provided with a plurality of power converters that are connected to a bus and that include a power conversion unit that converts a power that is input and outputs the converted power, a power element that is connected to the power converter and that is capable of supplying power, consuming power, and charging, and a central control device that controls the power converter, steps of, by the power conversion unit, converting a power that is input and outputting the converted power; controlling the power conversion unit and executing control on the output that is primary control based on a reference function having a drooping characteristic defined according to an input value and a voltage of the bus or a power of the power converter to which the power conversion unit is connected; by the central control device, performing secondary control on the power converter according to an update instruction to update the control method; and, by the power converter, updating a control method on the output according to the update instruction are executed and the control method is updated such that there is always at least one of the power converters that performs voltage control in a period in which the power converters update the control method and therefore, when the control method is updated, the voltage of the bus to which the power converter is connected is controlled by at least one of the power converters that perform voltage control and it is possible to inhibit occurrence of an unintentional increase in voltage or an unintentional decrease in voltage in the bus.

The present disclosure is not limited to the embodiments described above. An appropriate combination of the above-described components is also included in the present disclosure. Further effects and variations may be easily derived by those skilled in the art. Thus, the broader aspects of the present disclosure are not limited to the embodiments described above, and various modifications may be made.

What is claimed is:

1. A power system comprising:
a plurality of power converters, each including
a power conversion unit configured to
convert an input power, and
output the converted power,
a controller configured to execute a primary control for controlling the output by controlling the power conversion unit based on: a reference function having a drooping characteristic defined according to an input value, and a voltage of a DC bus or a power of the power converter to which the power conversion unit is connected, and
an update unit configured to update a control method on the output;
a central control device configured to execute a secondary control of controlling the power converter;
the DC bus connected to the power conversion unit; and
a power element connected to the power converter and configured to supply, consume and charge power
wherein the power system is a DC micro grid,
wherein the central control device is configured to perform the secondary control on the power converter according to an update instruction to update the control method, and
the update unit is configured to:
update the control method according to the update instruction output from the central control device; and
update the control method such that there is always at least one of the power converters that performs voltage control in a period in which the power converters update the control method.

2. The power system according to claim 1, wherein the primary control for controlling the output is executed based on the voltage or a current of the DC bus without an instruction from the central control device.

3. The power system according to claim 1, wherein the power converter executing the voltage control among the power converters is configured to update the control method after a predetermined time elapses after acquisition of the update instruction.

4. The power system according to claim 1, wherein, after outputting the update instruction to the power converter executing power control among the power converters, the central control device is configured to output the update instruction to the power converter executing the voltage control among the power converters.

5. A method of controlling a power system including a plurality of power converters connected to a DC bus, each of the power converters including: a power conversion unit configured to convert an input power and output the converted power; a power element connected to the power converter and configured to supply, consume and charge power; and a central control device configured to control the power converter, the method comprising:

converting, by the power conversion unit, the input power and outputting the converted power;

controlling the power conversion unit and executing a primary control for controlling the output based on a reference function having a drooping characteristic defined according to an input value and a voltage of the DC bus or a power of the power converter to which the power conversion unit is connected;

performing, by the central control device, a secondary control on the power converter according to an update instruction to update the control method; and updating, by the power converter, a control method on the output according to the update instruction, wherein the power system is a DC micro grid, wherein the control method is updated such that there is always at least one of the power converters that performs voltage control in a period in which the power converters update the control method.

\* \* \* \* \*